US012192099B2

(12) United States Patent
Sambandan et al.

(10) Patent No.: US 12,192,099 B2
(45) Date of Patent: Jan. 7, 2025

(54) SYSTEMS AND METHODS OF ORCHESTRATING A VIRTUALIZED BASE STATION

(71) Applicant: CommScope Technologies LLC, Hickory, NC (US)

(72) Inventors: Devaraj Sambandan, Bengaluru (IN); Shanthakumar Ramakrishnan, Westford, MA (US); Diwakaran Krishnamoorthi, Bengaluru (IN); Chandra Sekhar Chowdam, Bangalore (IN); Robert Graff, Satellite Beach, FL (US); Raymond Zachary Lovell, Lowell, MA (US)

(73) Assignee: CommScope Technologies LLC, Claremont, NC (US)

( * ) Notice: Subject to any disclaimer, the term of this patent is extended or adjusted under 35 U.S.C. 154(b) by 230 days.

(21) Appl. No.: 17/875,084

(22) Filed: Jul. 27, 2022

(65) Prior Publication Data

US 2023/0029632 A1 Feb. 2, 2023

(30) Foreign Application Priority Data

Jul. 27, 2021 (IN) .............................. 202141033610

(51) Int. Cl.
*H04L 45/64* (2022.01)
*H04L 12/46* (2006.01)
(Continued)

(52) U.S. Cl.
CPC .......... *H04L 45/64* (2013.01); *H04L 12/4641* (2013.01); *H04W 16/18* (2013.01); *H04W 28/0992* (2020.05)

(58) Field of Classification Search
CPC ............... H04L 45/64; H04L 12/4641; H04W 28/0992; H04W 16/18
(Continued)

(56) References Cited

U.S. PATENT DOCUMENTS

2015/0110008 A1\* 4/2015 Puthenpura ............. H04W 8/26
370/329
2017/0187572 A1\* 6/2017 Wu ..................... H04L 41/0806
(Continued)

FOREIGN PATENT DOCUMENTS

| CN | 104410672 A | * | 3/2015 | ............. H04L 29/08 |
| CN | 104581764 B | * | 2/2019 | ............ H04W 24/04 |

OTHER PUBLICATIONS

Machine Translation of CN 104581764, 2019 (Year: 2019).*
(Continued)

*Primary Examiner* — Ruolei Zong
(74) *Attorney, Agent, or Firm* — Fogg & Powers LLC

(57) ABSTRACT

Systems and methods for orchestrating a virtualized 5G gNB are provided. In one example, a system for orchestrating wireless service includes a scalable cloud environment configured to implement a base station using a plurality of virtualized base station entities. Each virtualized base station entity of the plurality of virtualized base station entities configured to implement at least some functions for one or more layers of a wireless interface used to communicate with UEs. The scalable cloud environment further configured to implement a service orchestration tool including one or more interfaces configured to receive common configuration parameters that are applicable to multiple sites of an operator and to receive site-specific configuration parameters that are unique to respective sites of the operator. The service orchestration tool configured to automatically generate deployment files for the plurality of virtualized base
(Continued)

station entities based on the common configuration parameters and the site-specific configuration parameters.

20 Claims, 14 Drawing Sheets

(51) Int. Cl.
*H04W 16/18* (2009.01)
*H04W 28/08* (2023.01)

(58) Field of Classification Search
USPC .......................................................... 709/224
See application file for complete search history.

(56) References Cited

U.S. PATENT DOCUMENTS

| | | | |
|---|---|---|---|
| 2018/0309517 A1 | 10/2018 | Zheng | |
| 2019/0280971 A1* | 9/2019 | Yu | H04L 12/4641 |
| 2019/0320487 A1 | 10/2019 | Khan | |
| 2019/0379728 A1* | 12/2019 | Hellstrom | H04L 43/16 |
| 2020/0221299 A1* | 7/2020 | Suthar | H04W 60/00 |
| 2020/0304408 A1* | 9/2020 | Suthar | H04L 67/141 |
| 2021/0132980 A1* | 5/2021 | Thakkar | H04L 67/34 |
| 2021/0132981 A1* | 5/2021 | Thakkar | G06F 9/5077 |
| 2021/0203550 A1* | 7/2021 | Thakkar | H04L 67/141 |
| 2021/0288879 A1* | 9/2021 | Yao | H04L 41/40 |
| 2022/0294691 A1* | 9/2022 | Kumar Skand Priya | G06F 8/60 |

OTHER PUBLICATIONS

GSMA, "AI in Network Use Cases in China", Oct. 2019, pp. Cover through 153, retrieved from https://www.gsma.com/futurenetworks/resources/ai-in-network-china.

International Searching Authority, "International Search Report and Written Opinion" from PCT Application No. PCT/US2022/038532, from Foreign Counterpart to U.S. Appl. No. 17/875,084, filed Nov. 7, 2022, pp. 1 through 10, Published in: KR.

Smith et al., "NGMN Overview on 5G RAN Functional Decomposition", NGMN, Feb. 27, 2018, pp. Cover through 47, retrieved from https://www.ngmn.org/publications/ngmn-overview-on-5g-ran-functional-decomposition.html.

* cited by examiner

FIG. 4C

```
gNBCuCpVnfId:                           gNBCuCpVnfId: LowellCPT3F1-
<gNBCuCpVnfId>                          45-CUCP
gNBCuUpVnfId:                           gNBCuUpVnfId: LowellCPT3F1-
<gNBCuUpVnfId>                          45-CUUP1
gNBDuVnfId: <gNBDuVnfId>      502       gNBDuVnfId: LowellCPT3F1-
                                        45-DU1
gNBCuUpId: <gNBCuUpId>
                              504       gNBCuUpId: 1
O1IpType: ipv6
E1IpType: ipv6                          O1IpType: ipv6
DpdkIpType: ipv6                        E1IpType: ipv6
SIMIpType: ipv4                         DpdkIpType: ipv6
                                        SIMIpType: ipv4
image:
    repository:                         image:
<common_repository>                         repository: 5g12devrepo:
    tag: <common_tag>                   10080/nr5g12dev/
                                            tag: ph1024_5.0.00.23
gnbSriovDevicePoolName:
"intel.com                              gnbSriovDevicePoolName:
/<netdevice_pool_name>"                 "intel.com
                                        /pci_sriov_net_physnet0"
podAnnotations:
    danm.k8s.io/interfaces:             podAnnotations:
|                                           danm.k8s.io/interfaces:
        [                               |
        {                                       [
"clusterNetwork":                               {
"default", "ip": "dynamic"              "clusterNetwork":
},                                      "default", "ip": "dynamic"
        {                               },
"clusterNetwork": "sriovdpdk",                  {
"ip6":                                  "clusterNetwork": "sriovdpdk",
"<cuup_s1ux2u_IP>",                     "ip6": "2001:0:0:1:
"proutes6":                             204", "proutes6": {"2001:
{"<cuup_s1u_nw>":                       abcd:ef10:00b9::/64":
"<cuup_s1u_gw>",                        "2001:0:0:1::254", "2001:
"<cuup_x2u_nw>":                        abcd:ef10:00ba::/64":
"<cuup_x2u_gw>"} },                     "2001:0:0:1::254"} },
        {                                       {
"clusterNetwork": "sriove1c",           "clusterNetwork": "sriove1c",
"ip6": "dynamic" },                     "ip6": "dynamic" },
        {                                       {
"clusterNetwork": "sriovo1c",           "clusterNetwork": "sriovo1c",
"ip6":                                  "ip6": "2001:0:0:2::
"<cuup_o1c_IP>",                        203", "proutes6": {"2001:
"proutes6":                             abff:cd01:aa0c::/64":
{"<cuup_o1_nw>":                        "2001:0:0:2::203"} }
"<cuup_o1_nw_gw>"} }                            }
        }                               netconfO1SshKey: |
netconfO1SshKey: |
    <cuup_netconfO1SshKey>
```

SYSTEMS AND METHODS OF ORCHESTRATING A VIRTUALIZED BASE STATION

CROSS-REFERENCE TO RELATED APPLICATIONS

This application claims benefit of India Provisional Application No. 202141033610 filed on Jul. 27, 2021, and titled "SYSTEMS AND METHODS OF ORCHESTRATING A VIRTUALIZED BASE STATION", the contents of which are incorporated herein by reference in their entirety.

BACKGROUND

Cloud-based virtualization of Fifth Generation (5G) base stations (also referred to as "g NodeBs" or "gNBs") is widely promoted by standards organizations, wireless network operators, and wireless equipment vendors. Such an approach can help provide better high-availability and scalability solutions as well as addressing other issues in the network.

FIG. 1 is a block diagram illustrating a typical 5G distributed gNB. In general, a distributed 5G gNB can be partitioned into different entities, each of which can be implemented in different ways. For example, each entity can be implemented as a physical network function (PNF) or a virtual network function (VNF) and in different locations within an operator's network (for example, in the operator's "edge cloud" or "central cloud").

In the particular example shown in FIG. 1, a distributed 5G gNB 100 is partitioned into one or more central units (CUs) 102, one or more distributed units (DUs) 104, and one or more radio units (RUs) 106. In this example, each CU 102 is further partitioned into a central unit control-plane (CU-CP) 108 and one or more central unit user-planes (CU-UPs) 110 dealing with the gNB Packet Data Convergence Protocol (PDCP) and higher layers of functions of the respective control and user planes of the gNB 100. Each DU 104 is configured to implement the upper part of the physical layer through the radio link control layer of both the control-plane and user-plane of the gNB 100. In this example, each RU 106 is configured to implement the radio frequency (RF) interface and lower physical layer control-plane and user-plane functions of the gNB 100.

Each RU 106 is typically implemented as a physical network function (PNF) and is deployed in a physical location where radio coverage is to be provided. Each DU 104 is typically implemented as a virtual network function (VNF) and, as the name implies, is typically distributed and deployed in a distributed manner in the operator's edge cloud. Each CU-CP 108 and CU-UP 110 are typically implemented as a virtual network functions (VNFs) and, as the name implies, are typically centralized and deployed in the operator's central cloud.

SUMMARY

In one example, a system for orchestrating wireless service includes a scalable cloud environment configured to implement a base station using a plurality of virtualized base station entities. Each virtualized base station entity of the plurality of virtualized base station entities is configured to implement at least some functions for one or more layers of a wireless interface used to communicate with user equipment. The scalable cloud environment is further configured to implement a service orchestration tool including one or more interfaces configured to receive common configuration parameters that are applicable to multiple sites of an operator and to receive site-specific configuration parameters that are unique to respective sites of the operator. The service orchestration tool is configured to automatically generate deployment files for the plurality of virtualized base station entities based on the common configuration parameters and the site-specific configuration parameters.

In another example, a method for orchestrating a virtualized gNB includes using a scalable cloud environment configured to implement a base station using a plurality of virtualized entities. Each virtualized entity of the plurality of virtualized entities is configured to implement at least some functions for one or more layers of a wireless interface used to communicate with user equipment. The method further includes using a scalable cloud environment configured to a service orchestration tool including one or more interfaces configured to receive common configuration parameters that are applicable to multiple sites of an operator and to receive site-specific configuration parameters that are unique to respective sites of the operator, wherein the service orchestration tool is configured to automatically generate deployment files for the plurality of virtualized entities based on the common configuration parameters and the site-specific configuration parameters.

DRAWINGS

Understanding that the drawings depict only exemplary embodiments and are not therefore to be considered limiting in scope, the exemplary embodiments will be described with additional specificity and detail through the use of the accompanying drawings, in which:

FIGS. 4A-4I are screenshots of an example implementation of a service orchestration tool; and FIGS. 5a-5b are diagrams of a template and example file used for deployment of a CU-UP VNF.

Figure 1:
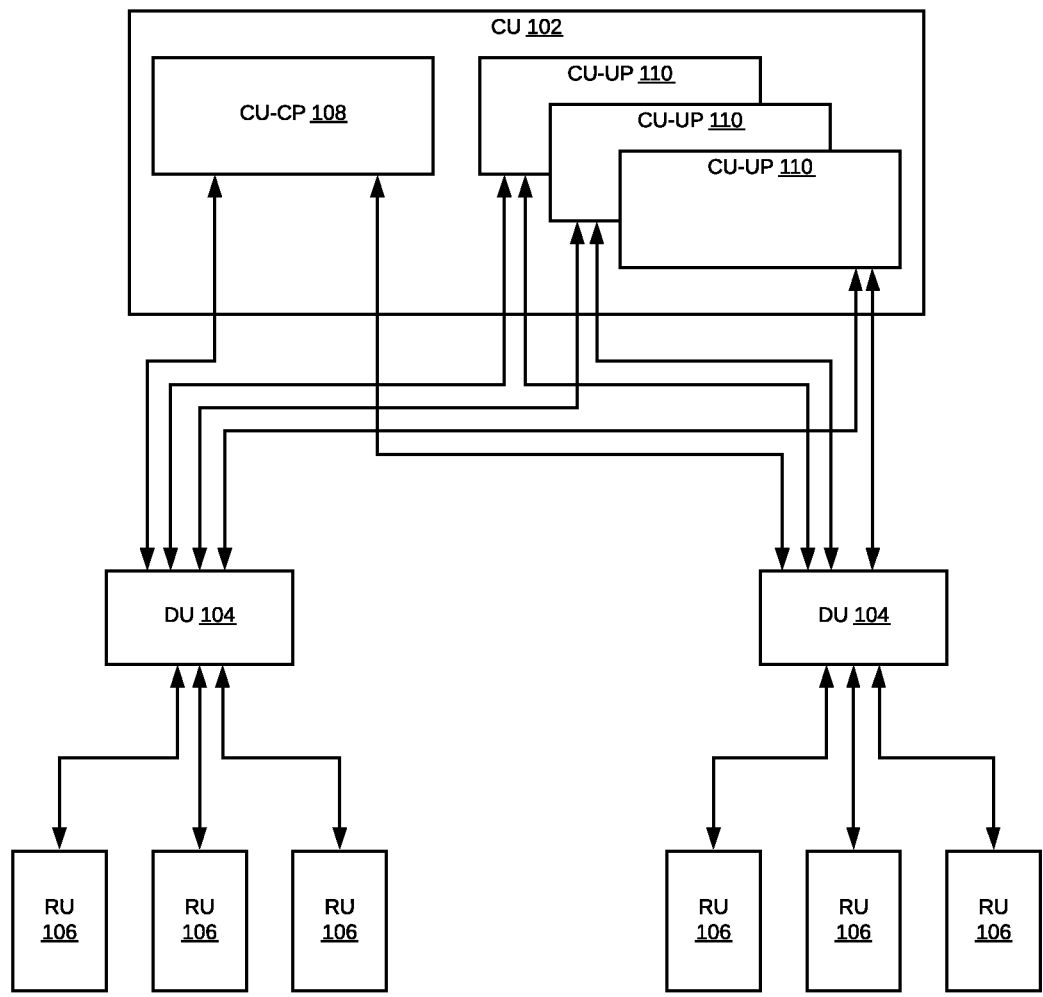
FIG. 1 is a block diagram illustrating a typical 5G distributed gNB.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be used and that logical, mechanical, and electrical changes may be made. The following detailed description is, therefore, not to be taken in a limiting sense.

Many 4G solutions included PNF based deployments where most of the configurations (for example, interface names, service names, etc.) are defined as part of the platform itself in the controller software image. For such solutions, there were only limited configurations required to be performed via a web graphical user interface (GUI) configuration. These limited configurations could be performed manually with small chance of human error.

For 5G gNB solutions, which are based on a software defined networking (SDN)/VNF model (and can be deployed in a containerized environment), the configuration and orchestration required for implementing a virtualized gNB can be very complicated and is highly prone to human error if performed manually. Implementing a virtualized gNB requires a complicated 5G RAN orchestration process that includes many installation configurations that need to be performed in multiple stages by a variety of entities. The 5G service being tied to specific locations and requiring physical remote units that radiate signals to user equipment adds constraints and complexity for orchestration compared to services orchestrated using Amazon Web Services or Azure, for example, which are in a purely virtual environment and not tied to a physical service.

The virtualization infrastructure/environment required for gNB VNFs is brought up from bare metal servers and relevant network and storage equipment (for example, using platform orchestration through an edge cloud node management network or controller). The edge services are then orchestrated and the gNB VNFs are deployed and orchestrated into service providing entities (for example, using service orchestration through a virtual network function manager (VNFM)). The gNB VNFs are also configured and activated to make them service ready (for example, using service configuration with an Operations and Maintenance (OAM) entity or Element Management System (EMS)). Lastly, the Fault, Configuration, Accounting, Performance, and Security (FCAPS) for the RAN need to be initiated.

In the absence of a management and network orchestration (MANO) environment for service orchestration, a number of areas need to be addressed to ensure proper configuration of the virtualized gNB. During the commissioning stage, it is desirable to configure interface names, Internal virtual local area network (VLAN) IDs, Service Names (FQDN), etc., in a standardized way that will enable end users to easily identify the VNFs in an Edge Container Infrastructure Management (CIM) environment, for example, while troubleshooting, reviewing the logs, etc. If the naming conventions for interfaces and service names are left to the field deployment, then there is high possibility of name conflict with one deployment to another, which can significantly delay orchestration.

Further, VNFs do not include MAC addresses, so the VNFs require certain naming conventions (for example, for Kubernetes (K8s) Name spaces, K8s Pod Deployments) so that a support team can trace the VNF instances from the EMS, Alarms, Performance OMS, etc. The names for resources should be derived in such a way that it does not require maintaining a separate mapping table to identify the resources for each deployment in order to debug the deployments.

The systems and methods described herein provide a service orchestration tool to generate the required configurations for implementing a virtualized gNB in a consistent and efficient manner. The service orchestration tool can be used by a tech support team, for example, whenever a new deployment site is commissioned or modified. The service orchestration tool includes one or more interfaces for the end user to input the required data related to the venue/enterprise (for example, the output of the RF design, bill of materials generation, and site planning activity). The service orchestration tool is configured to automatically generate the required configuration and deployment files based on the data provided via the interface(s), which are used to orchestrate and implement the virtualized gNB.

Figure 2:
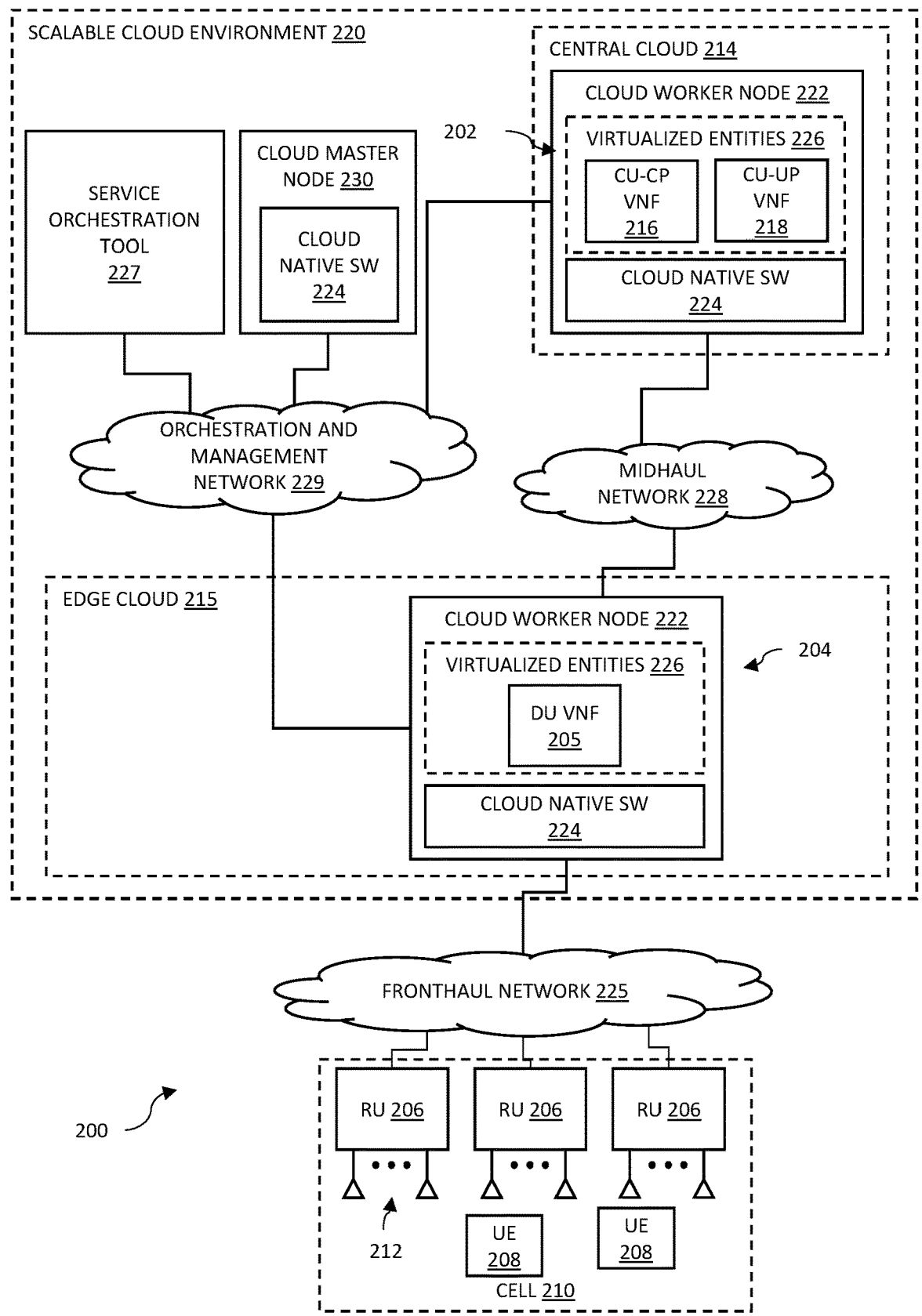
FIG. 2 is a block diagram of an example virtualized 5G gNB.

FIG. 2 is a block diagram illustrating one example of a virtualized 5G gNB 200 in which the service orchestration techniques described here can be used. In the particular example shown in FIG. 2, the virtualized 5G gNB 200 is partitioned into one or more virtualized central units (vCUs) 202, which is composed of one virtualized central unit control-plane (vCU-CP) 216 and one or more virtualized central unit user-planes (vCU-UPs) 218, one or more virtualized distributed units (vDUs) 204, which is composed of one or more DU virtual network functions 205, and one or more radio units (RUs) 206. In this example the virtualized 5G gNB 200 is configured so that each vCU 202 is configured to serve one or more vDUs 204 and each vDU 204 is configured to serve one or more RUs 206. In the particular configuration shown in FIG. 2, a single vCU 202 serves a single vDU 204, and the vDU 204 shown in FIG. 2 serves three RUs 206. However, the particular configuration shown in FIG. 2 is only one example; other numbers of vCUs 202, vDUs 204, and RUs 206 can be used. Also, the number of vDUs 204 served by each vCU 202 can vary from vCU 202 to vCU 202; likewise, the number of RUs 206 served by each DU can vary from vDU 204 to vDU 204. Moreover, although the following embodiments are primarily described as being implemented for use to provide 5G NR service, it is to be understood the techniques described here can be used with other wireless interfaces (for example, fourth generation (4G) Long-Term Evolution (LTE) service) and references to "gNB" can be replaced with the more general term "base station" or "base station entity" and/or a term particular to the alternative wireless interfaces (for example, "enhanced NodeB" or "eNB"). Furthermore, it is also to be understood that 5G NR embodiments can be used in both standalone and non-standalone modes (or other modes developed in the future) and the following description is not intended to be limited to any particular mode. Also, unless explicitly indicated to the contrary, references to "layers" or a "layer" (for example, Layer 1, Layer 2, Layer 3, the Physical Layer, the MAC Layer, etc.) set forth herein refer to layers of the wireless interface (for example, 5G NR or 4G LTE) used for wireless communication between a base station and user equipment).

In general, the virtualized gNB 200 is configured to provide wireless service to various numbers of user equipment (UEs) 208 using one or more cells 210 (only one of which is shown in FIG. 2 for ease of illustration). Each RU 206 includes or is coupled to a respective set of one or more antennas 212 via which downlink RF signals are radiated to UEs 208 and via which uplink RF signals transmitted by UEs 208 are received.

In one configuration (used, for example, in indoor deployments), each RU 206 is co-located with its respective set of antennas 212 and is remotely located from the vDU 204 and CU 202 serving it as well as the other RUs 206. In another configuration (used, for example, in outdoor deployments), the respective sets of antennas 212 for multiple RUs 206 are deployed together in a sectorized configuration (for example, mounted at the top of a tower or mast), with each set of antennas 212 serving a different sector. In such a sectorized configuration, the RUs 206 need not be co-located with the respective sets of antennas 212 and, for example, can be co-located together (for example, at the base of the tower or mast structure) and, possibly, co-located with its serving vDUs 204. Other configurations can be used.

The virtualized gNB 200 is implemented using a scalable cloud environment 220 in which resources used to instantiate each type of entity can be scaled horizontally (that is, by increasing or decreasing the number of physical computers or other physical devices) and vertically (that is, by increasing or decreasing the "power" (for example, by increasing the amount of processing and/or memory resources) of a given physical computer or other physical device). The scalable cloud environment 220 can be implemented in various ways. For example, the scalable cloud environment 220 can be implemented using hardware virtualization, operating system virtualization, and application virtualization (also referred to as containerization) as well as various combinations of two or more of the preceding. The scalable cloud environment 220 can be implemented in other ways. For example, as shown in FIG. 2, the scalable cloud environment 220 is implemented in a distributed manner. That is, the scalable cloud environment 220 is implemented as a distributed scalable cloud environment 220 comprising at least one central cloud 214 and at least one edge cloud 215.

In the example shown in FIG. 2, each RU 206 is implemented as a physical network function (PNF) and is deployed in or near a physical location where radio coverage is to be provided. In this example, each vDU 204 is implemented with one or more DU virtual network functions (VNFs) and, as the name implies, is distributed and deployed in a distributed manner in the edge cloud 215. Each CU-CP 216 and CU-UP 218 is implemented as a virtual network function (VNF) and, as the name implies, are centralized and deployed in the central cloud 214. In the example shown in FIG. 2, the vCU 202 (including the CU-CP VNF 216 and CU-UP VNF 218) and the entities used to implement it are communicatively coupled to each vDU 204 served by the vCU 202 (and the DU VNF(s) 205 used to implement each such vDU 204) over a midhaul network 228 (for example, a network that supports the Internet Protocol (IP)). In the example shown in FIG. 2, each vDU 204 and the DU VNF(s) 205 used to implement it are communicatively coupled to each RU 206 served by the vDU 204 using a fronthaul network 225 (for example, a switched Ethernet network that supports the IP).

As shown in FIG. 2, the scalable cloud environment 220 comprises one or more cloud worker nodes 222 that are configured to execute cloud native software 224 that, in turn, is configured to instantiate, delete, communicate with, and manage one or more virtualized entities 226. For example, where the service orchestration techniques described here are implemented at the operating system virtualization level, each cloud worker node 222 comprises one or more virtualized entities 226 and a cloud native software 224, the cloud native software 224 comprises a shared host operating system, and the virtualized entities 226 comprise one or more virtual network functions (VNFs), and each VNF further comprises one or more functional containers. In another example, where the service orchestration techniques described here are implemented at the hardware virtualization level, the cloud worker nodes 222 comprise respective clusters of physical worker nodes, the cloud native software 224 comprises a hypervisor (or similar software), and the virtualized entities 226 comprise virtual machines.

In the example shown in FIG. 2, a node of the scalable cloud environment 220 is designated as the cloud "master" node 230. The cloud master node 230 is configured to implement management and orchestration processes for the worker nodes 222 in a cluster and the cloud master node 230 is communicatively coupled to the worker nodes 222 via an orchestration and management network 229. In some examples, the cloud master node 230 is configured to determine what runs on each of the cloud worker nodes 222, which can include scheduling, resource allocation, state maintenance, and monitoring. In some examples, the cloud master node is configured to manage the lifecycle, scaling, and upgrades of workloads (such as containerized applications) on the cloud worker nodes 222.

In the example shown in FIG. 2, each DU VNF 205, CU-CP VNF 216, and CU-UP VNF 218 is implemented as a software virtualized entity 226 that is executed in the scalable cloud environment 220 on a cloud worker node 222 under the control of the cloud native software 224 executing on that cloud worker node 222. In the following description, a cloud worker node 222 that implements at least a part of a vCU 202 (for example, a CU-CP VNF 216 and/or a CU-UP VNF 218) is also referred to here as a "CU cloud worker node" 222, and a cloud worker node 222 that implements at least a part of a vDU 204 is also referred to here as a "DU cloud worker node" 222.

In the example shown in FIG. 2, the CU-CP VNF 216 and the CU-UP VNF 218 are each implemented as a single virtualized entity 226 executing on the same cloud worker node 222. In the example shown in FIG. 2, the DU VNF 205 is implemented as a single virtualized entity 226 executing on the same cloud worker node 222. However, it is to be understood that this is just one example and that different configurations and examples can be implemented in other ways. For example, the vCU 202 can be implemented using multiple CU-UP VNFs 218 using multiple virtualized entities 226 executing on one or more cloud worker nodes 222. In another example, multiple DU VNFs 205 (using multiple virtualized entities 226 executing on one or more cloud worker nodes 222) can be used to serve a cell, where each of the multiple DU VNFs 205 serves a different set of RUs 206. Moreover, it is to be understood that the vCU 202 and vDU 204 can be implemented in the same cloud (for example, together in an edge cloud 215). Other configurations and examples can be implemented in other ways.

In the example shown in FIG. 2, a service orchestration tool 227 included in the scalable cloud environment 220 is communicatively coupled to the components of the virtualized gNB 200 via the orchestration and management network 229. In some examples, the service orchestration tool 227 is included in the central cloud 214. The service orchestration tool 227 can be used by end users tasked with commissioning the virtualized gNB 200.

Figure 3:
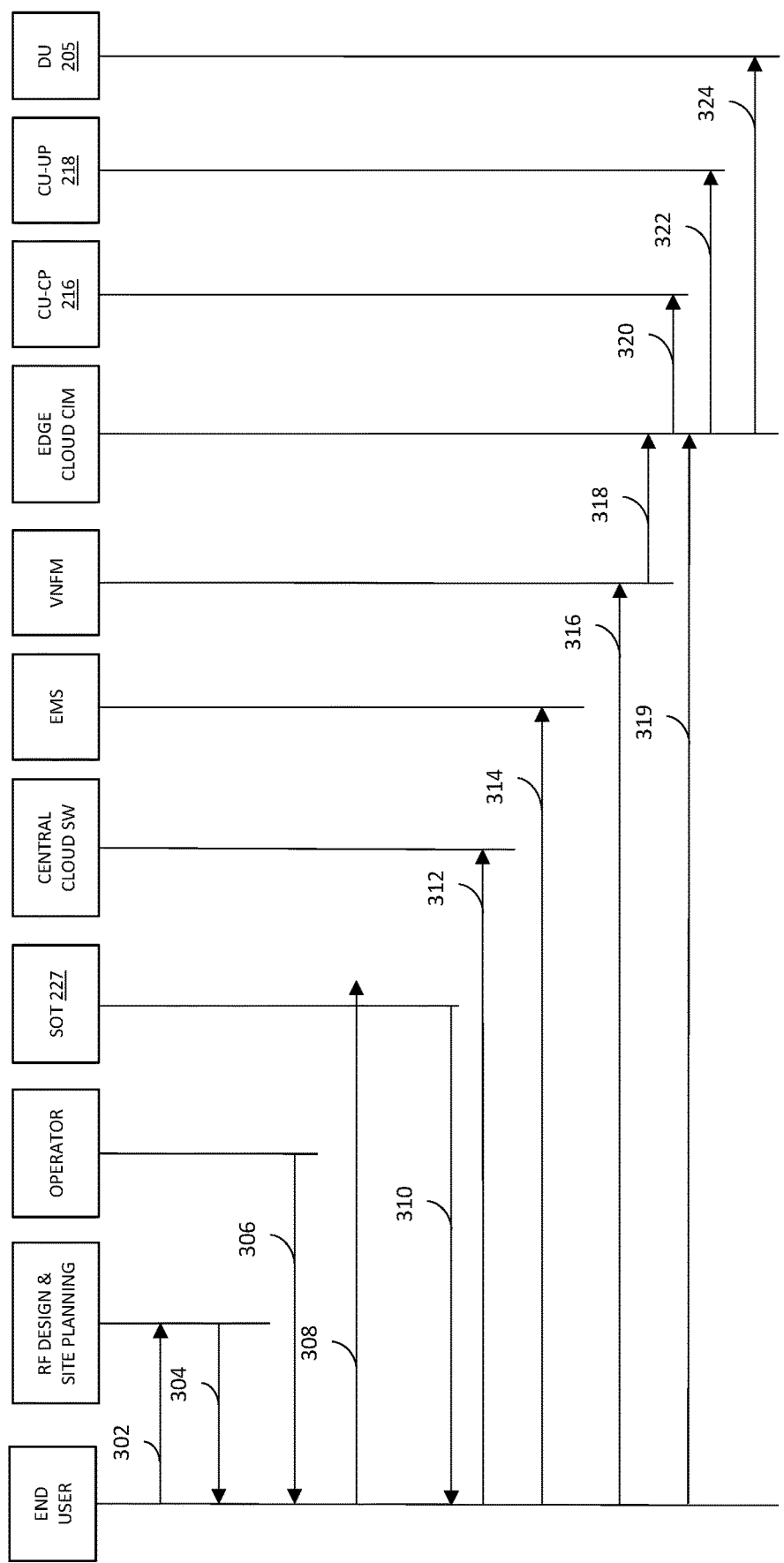
FIG. 3 is a sequence diagram illustrating the stages of commission a virtualized 5G gNB.

FIG. 3 is a sequence diagram illustrating the stages of commission a virtualized 5G gNB utilizing the service orchestration tool 227. In the example shown in FIG. 3, an end user (for example, a site commissioning team or other end user(s)) initiates planning of the particular site(s) for the virtualized gNB, and site-specific configuration parameters related to RF design and site planning are generated and provided to the end user 304. The site-specific configuration parameters will vary from site to site for a particular operator. In some examples, the site-specific configuration parameters related to RF design and site planning are provided in a file (for example, an iBWave file) containing the information from the site survey and RF design. In some examples, a bill of materials (including, for example, the number of vCUs/vDUs/RUs and the number of switches) is also provided as part of the site-specific configuration parameters related to RF design and site planning to the end user.

In the example shown in FIG. 3, the operator for the virtualized gNB provides site-specific configuration parameters to the end user 306. In some examples, the site-specific configuration parameters from the operator are provided in a Customer Information Questionnaire (CIQ), Site Specific Provisioning Data Form, or other form. The site-specific configuration parameters provided by the operator can include, for example, a source IP address range for the site for core network communications, RAN configurations for CU-CP VNF 216, CU-UP VNF 218, and DU VNF 205, and/or an identifier for the gNB 200 that includes the vCU 202 and vDU 204.

Figure 4A:
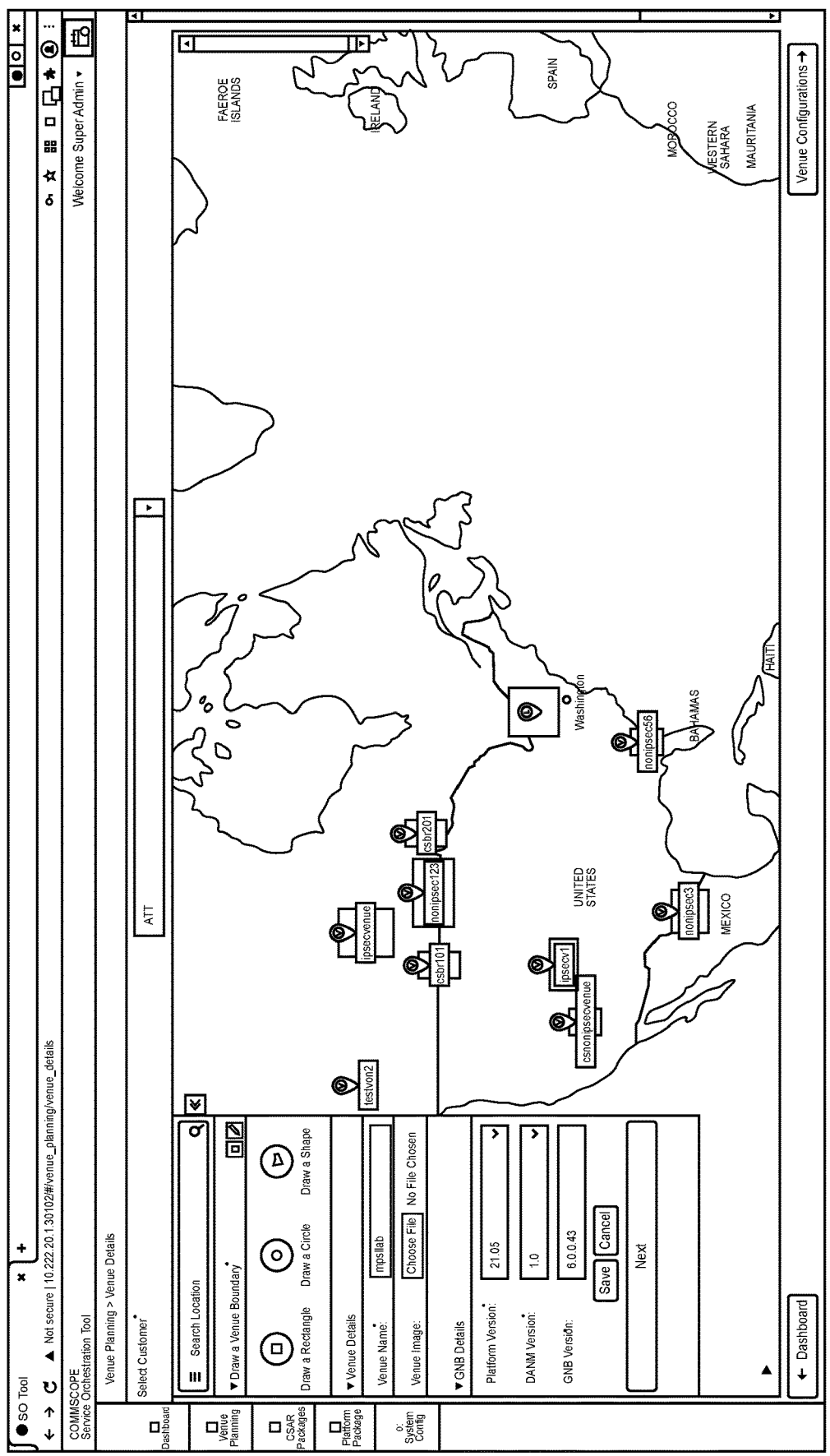
Figure 4B:
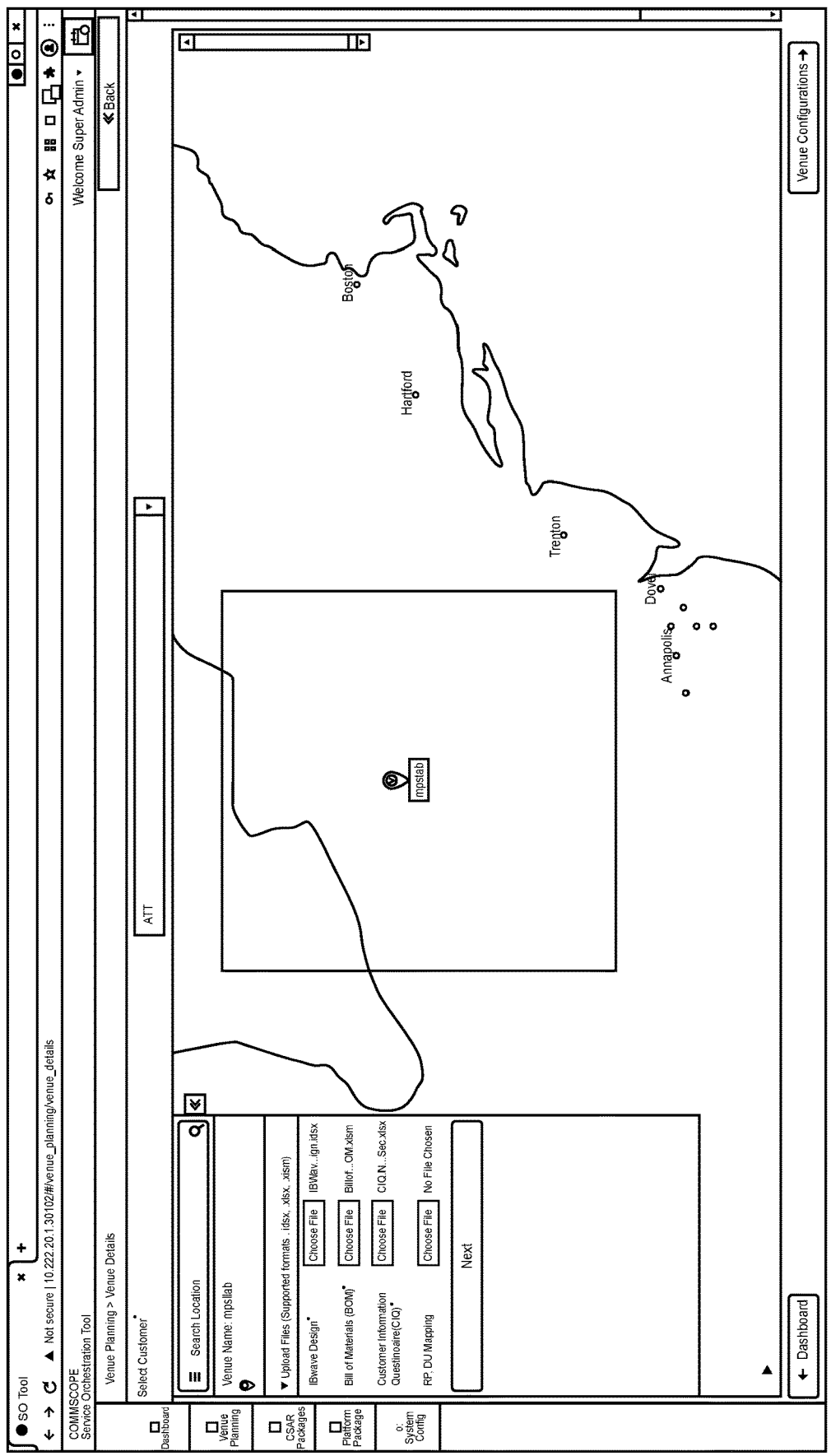

In the example shown in FIG. 3, the end user provides configuration parameters to the service orchestration tool 308. The service orchestration tool includes one or more interfaces configured to receive inputs from the end user. One example implementation of the interfaces used for the service orchestration tool are illustrated in FIGS. 4A-4B, which show screen shots of multiple interfaces for uploading files to the service orchestration tool. In the examples shown in FIGS. 4A-4B, the service orchestration tool also includes features that enable an end user to select and configure multiple locations, venues, and virtualized gNBs for respective customers.

The end user provides the site-specific configuration parameters described above. In some examples, the end user also provides other site-specific configuration parameters from a management service provider. The site-specific configuration parameters from the management service provider can include, for example, VNF specific configurations (for example, deployment specific parameters), Precision Time Protocol (PTP) related configurations, venue related information (for example, locations, floor plan, and CU/DU/RU associations), and/or external VLAN IP address range for infrastructure/additional data traffic).

The end user also provides common configuration parameters, which are generally applicable to multiple sites for an operator, to the service orchestration tool. In some examples, at least some of the common configuration parameters are from the operator. Such common configuration parameters provided by the operator can include, for example, a virtual land area network (VLAN) ID for mobile core network traffic and/or mobile core network server details (such as the SGW, MME, etc., which can be geographical area based). In some examples, at least some of the common configuration parameters are provided by a management service provider. Such common configuration parameters from the management service provider can include, for example, Element Management System (EMS) server details (for example, NetConf/VES URL, credentials, certificates), hosting specific configurations for the VNFs, certificates and Secure Shell Protocol (SSH) keys, and/or VNF images (for example, software release DOCKER images) and charts (for example, HELM charts).

In some examples, the end user also provides a radio unit and gNB mapping file, which contains all RUs and the corresponding details for each RU (for example, associated gNB identifiers, Serial Number, MAC address, IP Address, software version, etc.). In such examples, the radio unit and gNB mapping file preferably contains the mapping for each RU imported using an iBWave design for an operator venue.

The service orchestration tool 227 is configured to automatically generate deployment files for the VNFs based on the common configuration parameters and the site-specific configuration parameters input via the interfaces of the service orchestration tool 227. In the example shown in FIG. 3, the automatically generated deployment files for the VNFs are provided to the end user 310.

The deployment files for the VNFs include a plurality of configuration settings that are used to orchestrate and/or instantiate the VNFs. In some examples, the configurations settings for each VNF include a VNF identifier, identifiers for each interface of the VNF used for communication, identifiers for the service provided via each interface of the VNF, identifiers for each virtual local area network used for communication with the VNF, and respective IP addresses for each interface of the VNF. Each interface of the VNF is used to communicate a different type of traffic. For example, different interfaces of the VNF are used to communicate O1 traffic with a service management network and X2 traffic with a mobile core network.

In some examples, the service orchestration tool is configured to automatically assign the identifiers for each interface of the VNF used for communication based on the type of traffic communicated using the interface. For example, the identifier for the interface of the VNF configured to communicate F1-C traffic could be "netflc" or something similar.

In some examples, the service orchestration tool is configured to use a consistent theme for automatically assigning the identifiers to the various components of the VNFs. For example, interfaces in respective VNFs (for example, the CU-CP and CU-UP) that are configured to communicate the same type of traffic will be assigned the same identifier. For example, the identifier for the interface of the DU VNF 205 configured to communicate F1-C traffic could be "netflc" and the interface of the CU-CP 216 configured to communicate F1-C traffic would be assigned the same identifier.

The service orchestration tool is configured to utilize a similar approach when automatically assigning identifiers to the VNFs and/or services provided via each interface of the VNF. A gNB can include one or more CU-UP VNFs and one or more DU VNFs per CU-UP VNF. For example, a gNB can include one CU-UP VNF and two DU VNFs. Since the identifier for the VNFs need to be unique for a single gNB, different identifiers need to be assigned to the DU VNFs. For example, the identifier for the first DU VNF could be "gnb-du1" and the identifier for the second DU VNF could be "gnb-du2" or something similar.

In some examples, the service orchestration tool is also configured to autogenerate the identifiers for the VLAN based on IP address range information included in the site-specific configuration parameters. A separate VLAN is used by the gNB to communicate each different type of traffic with the VNFs. In some examples, the service orchestration tool is configured to sequentially assign IP addresses to the interfaces of each VNF for each different type of traffic based on the IP address range information included in the site-specific parameters.

Figure 4C:
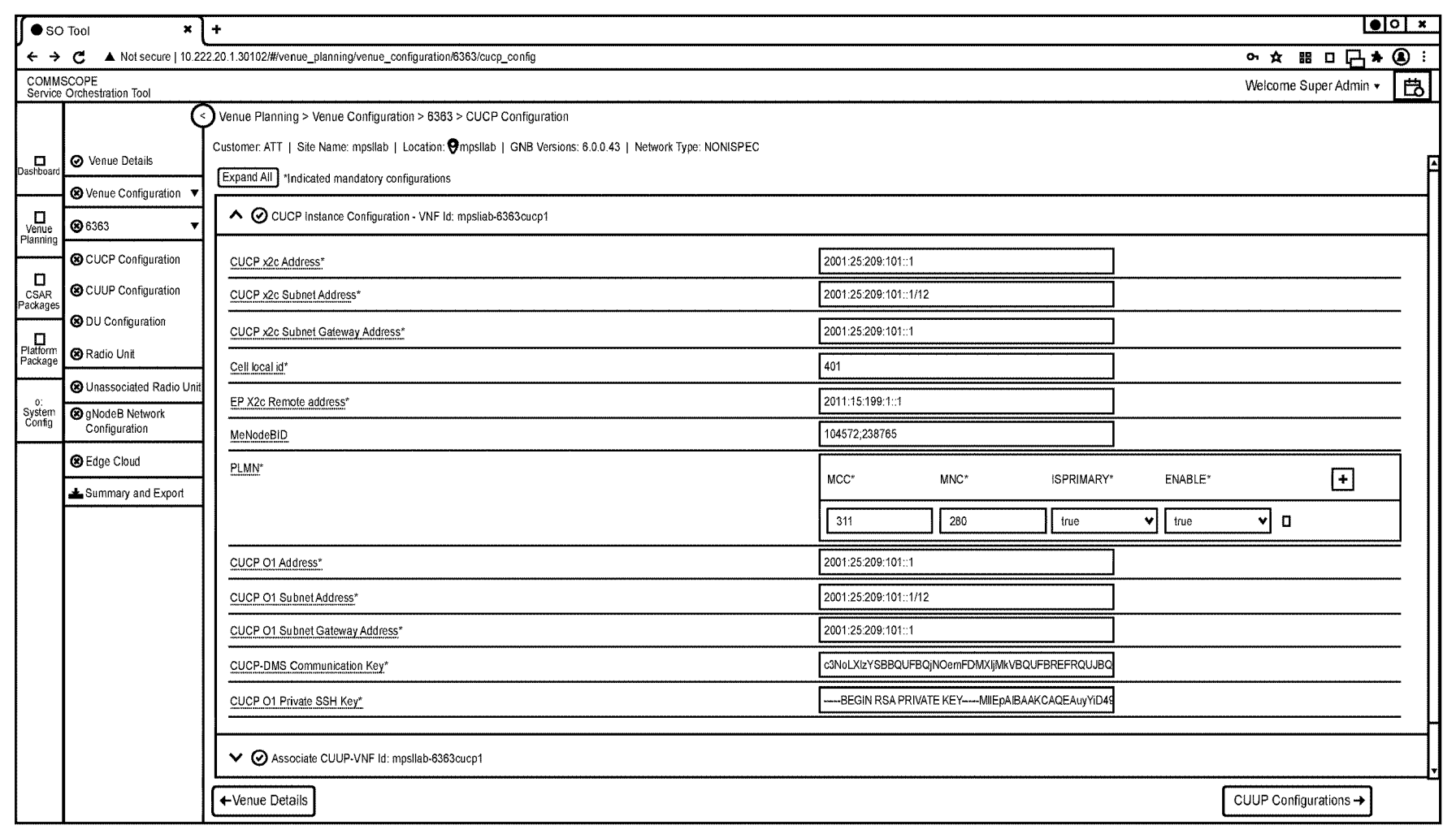
Figure 4D:
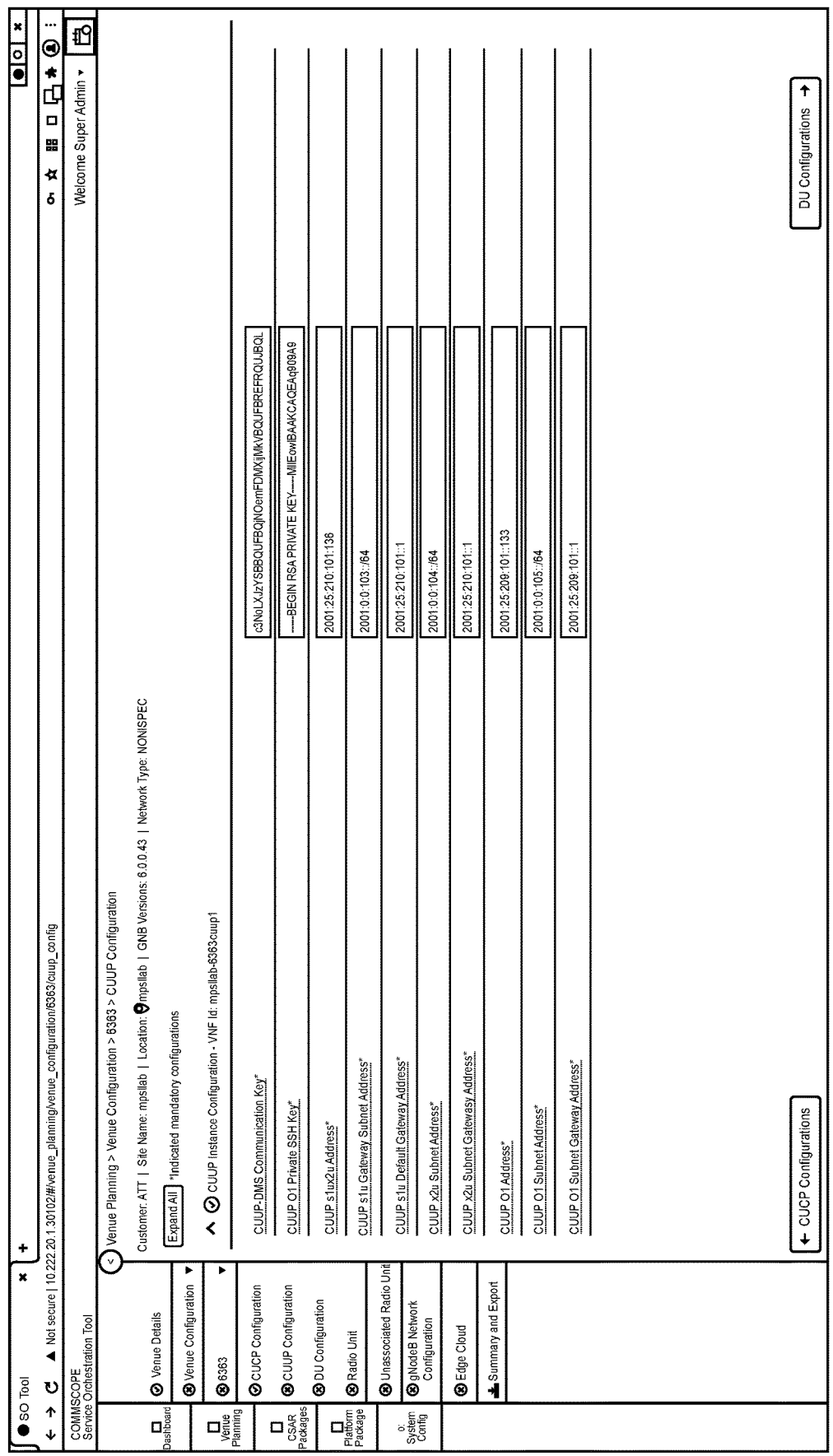
Figure 4E:
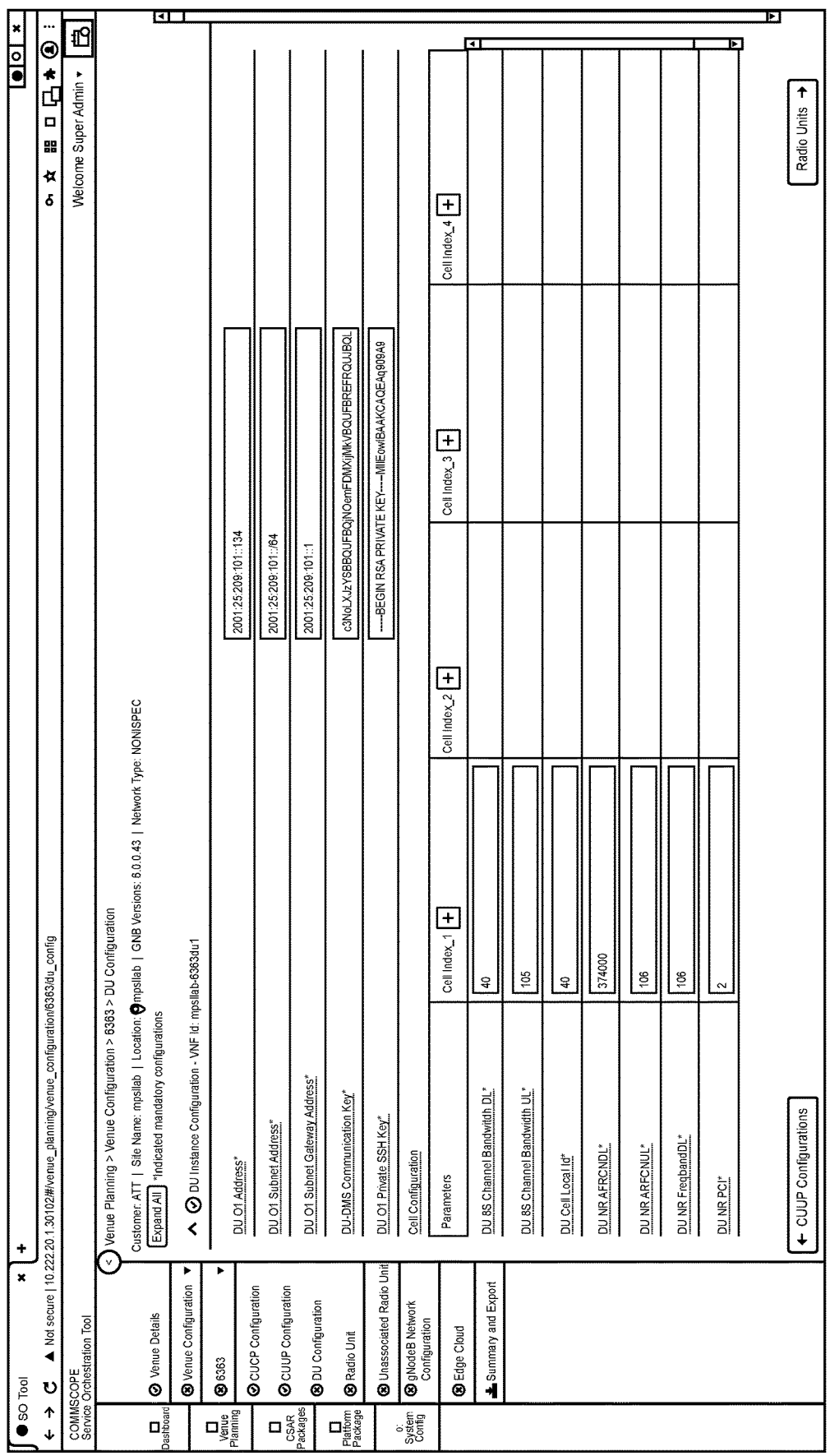

FIGS. 4C-4E are screen shots of example configuration settings for the CU-CP, CU-UP, and DU, respectively, generated by the service orchestration tool 227 based on common configuration parameters and site-specific configuration parameters provided to the service orchestration tool via the interfaces shown in FIGS. 4A-4B.

The configurations needed for the gNB VNFs to function generally fall into two categories: (1) initial startup configurations (all the configurations for the CU-CP VNF, CU-UP VNF, and the DU VNF to come into an operational state); and (2) RAN service configurations (all the configurations for the CU-CP VNF, CU-UP VNF, and the DU VNF to come into a radio transmitting state). In some examples, the service orchestration tool 227 is configured to automatically generate deployment files for the VNFs by assigning default configuration settings based on the common configuration parameters. After the VNFs are brought into an operational state, then the site-specific configuration settings are substituted for the default configuration settings. In some examples, the site-specific configuration settings are substituted from the default configuration settings using variable declarations and adjusting the value of the variables.

Figure 5B:

Example contents of a deployment file for a CU-UP VNF are included in FIGS. 5A-5B. The template file 502 in FIGS. 5A-5B can be used as a basis for generating the deployment file for any CU-UP VNF. The configuration settings, which are listed and followed by variables, can be set using the common configuration parameters and/or site-specific parameters. The example file 504 in FIGS. 5A-5B shows exemplary values that have been set for the variables corresponding to the configuration settings. The deployment files for the CU-CP VNF and DU VNFs of the virtualized gNB can be generated using similar techniques with the respective configuration settings utilized for the particular type of VNF.

In some examples, the service orchestration tool 227 is also configured to automatically generate one or more additional configuration files based on the common configuration parameters and the site-specific configuration parameters. The one or more additional configuration files can be utilized to facilitate orchestration and/or instantiation of the VNFs.

In some examples, the service orchestration tool 227 is configured to automatically generate one or more configuration files that can be utilized by the Element Management System (EMS) based on the common configuration parameters and the site-specific configuration parameters input via the interfaces of the service orchestration tool 227. In some examples, the Element Management System (EMS) is a Device Management System (DMS). In some examples, the one or more configuration files that can be utilized by the EMS can include NetConf Mount Files for the VNFs, which are used by the EMS to create mount points for communications (for example, O1 communications). The NetConf Mount Files for the VNFs can contain information about the CU-CP, CU-UP, and DU such as, for example, an identifier and NetConf connection details.

Figure 4F:
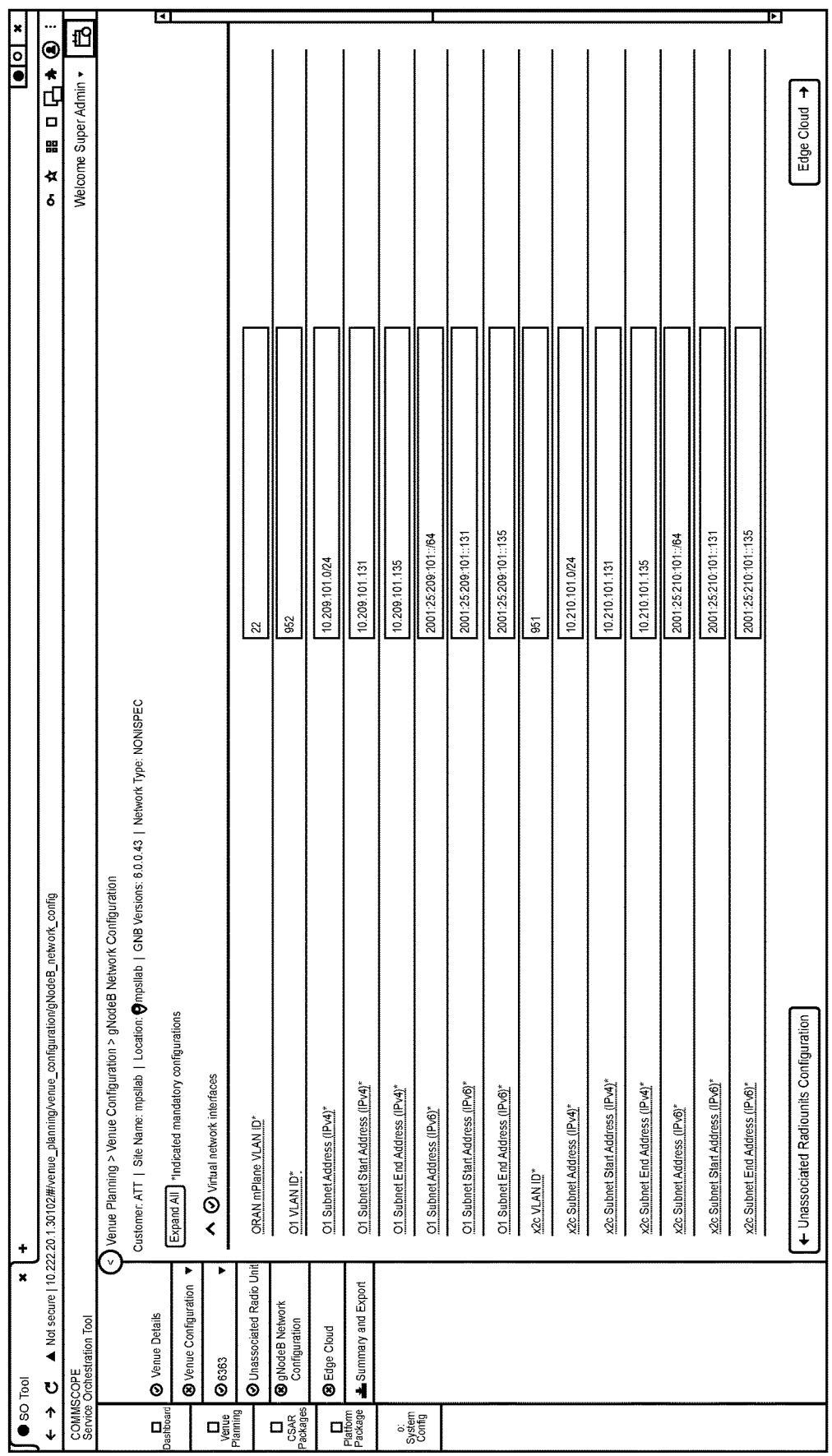

FIG. 4F is a screen shot of an example configuration file that can be utilized by the EMS generated by the service orchestration tool based on common configuration parameters and site-specific configuration parameters provided to the service orchestration tool via the interfaces shown in FIGS. 4A-4B. In the example shown in FIG. 4F, the configuration file includes a identifiers and IP addresses that will be used by the EMS to configure the VNFs.

Figure 4G:
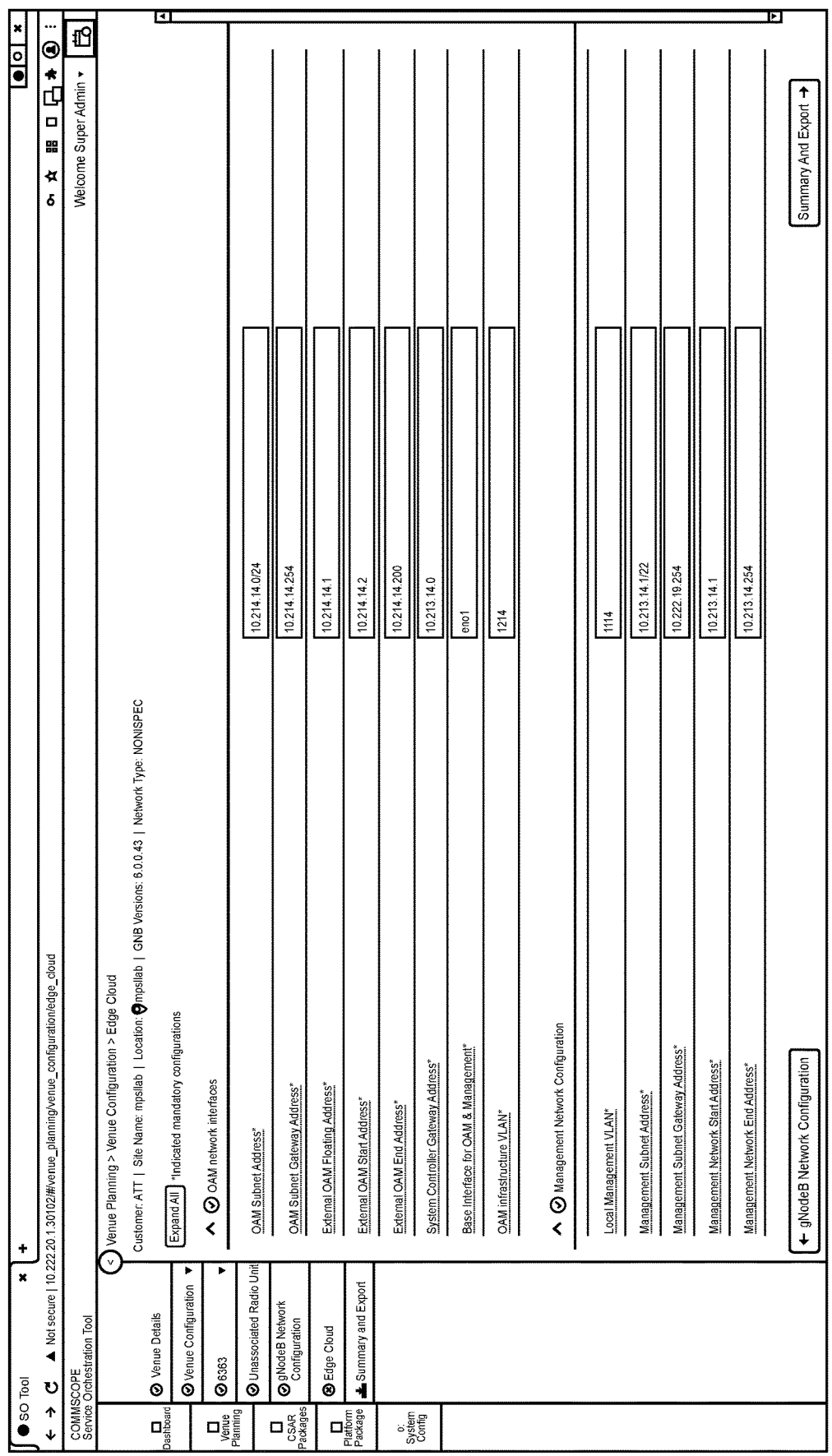

In some examples, the service orchestration tool 227 is configured to automatically generate one or more edge cloud configuration files based on the common configuration parameters and the site-specific configuration parameters input via the interfaces of the service orchestration tool 227. The one or more edge cloud configuration files can include an identifier for the particular edge cloud and Internet Protocol (IP) address range for infrastructure network traffic. FIG. 4G is a screen shot of example configuration settings for the Edge Cloud configuration files generated by the service orchestration tool based on common configuration parameters and site-specific configuration parameters provided to the service orchestration tool via the interfaces shown in FIGS. 4A-4B.

The service orchestration tool 227 can be configured to generate other types of files (for example, a venue settings file including information about the venue or a service settings file including Plug and Play configurations used to commission the VNFs) based on the common configuration parameters and the site-specific configuration parameters using similar techniques to those described above.

Referring back to FIG. 3, the service orchestration tool provides the automatically generated deployment files and configuration files, if applicable, to the end user 310. In some examples, the service orchestration tool is configured to generate a respective export file for each deployment file and configuration file that is provided to the end user.

In the example shown in FIG. 3, the end user brings up the edge cloud using the one or more edge cloud configuration files 312 and provides one or more configuration files to the EMS that will be used to configure the VNFs into a Service Ready State 314.

In the example shown in FIG. 3, the end user provides the deployment files for the VNFs to the VNF manager (VNFM) 316. In some examples, the VNFM is deployed as a hosted service along with the service orchestration tool and/or the EMS. In the example shown in FIG. 3, the end user physically commissions the edge cloud 319, and the VNFM deploys the VNFs in the edge cloud 319. In the example shown in FIG. 3, the CU-CP VNF 216, CU-UP VNF 218, and DU VNF 205 are instantiated in the edge cloud 320, 322, 324.

In some examples, the service orchestration tool 227 is configured to automatically deploy the CU-CP VNF 216, CU-UP VNF 218, and/or DU VNF 205 into the edge cloud by directly interacting with the VNFM. In examples where the CU-CP VNF 216, CU-UP VNF 218, and DU VNF 205 are automatically deployed by the service orchestration tool 227, the end user need not interface with the VNFM (for example, by providing the deployment files for the VNFs to the VNFM) in order for the CU-CP VNF 216, CU-UP VNF 218, and DU VNF 205 to be deployed in the edge cloud. In some such examples, the service orchestration tool 227 does not provide the deployment files for the VNFs to the end user.

Figure 4H:
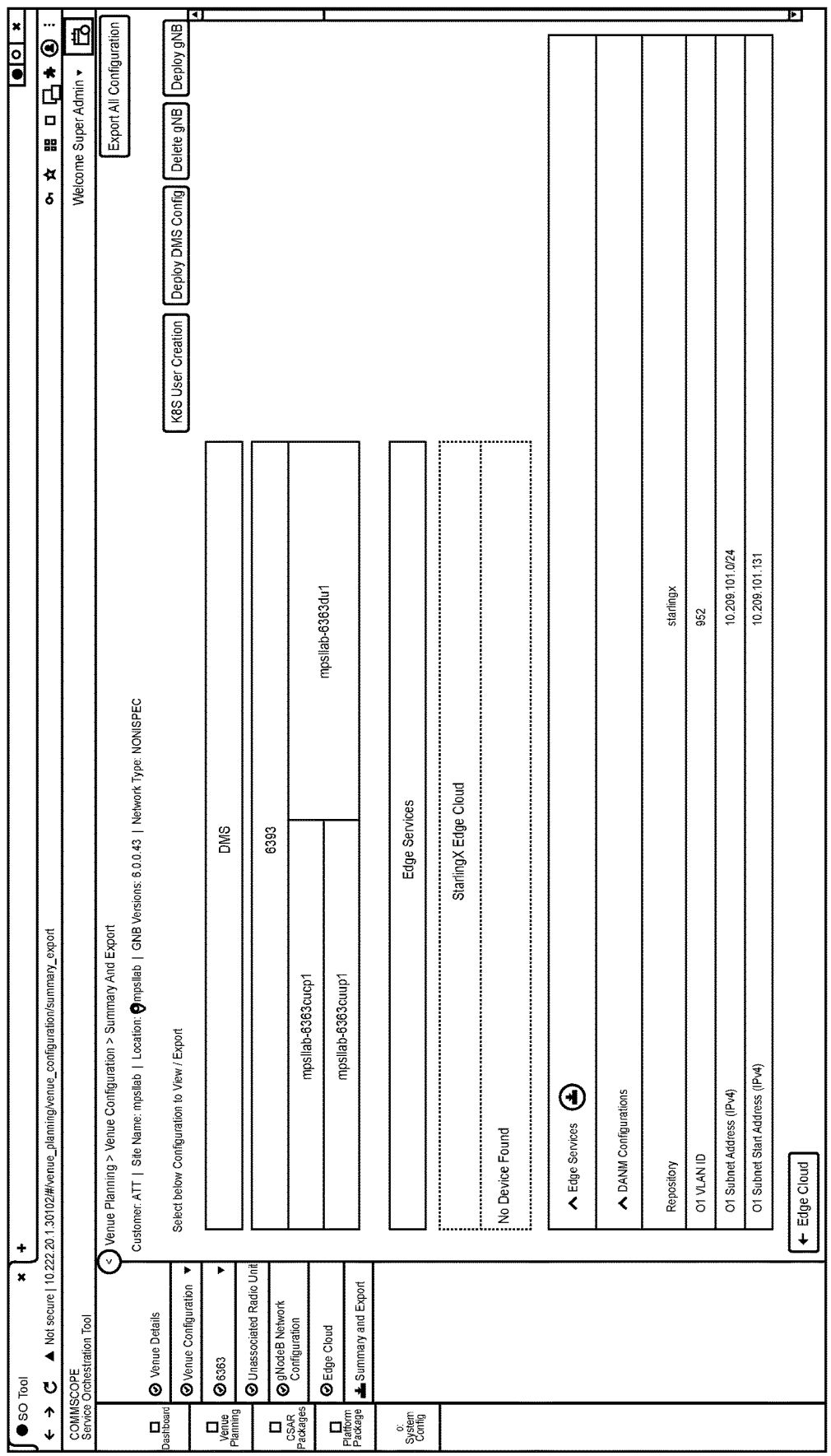

FIG. 4H is a screen shot of an example implementation of the service orchestration tool 227 where the service orchestration tool 227 is configured to automatically deploy the CU-CP VNF 216, CU-UP VNF 218, and/or DU VNF 205 into the edge cloud. In the example shown in FIG. 4H, the service orchestration tool 227 includes a deploy button (Deploy gNB), which will automatically deploy the CU-CP VNF 216, CU-UP VNF 218, and DU VNF 205 in the edge cloud. In the example shown in FIG. 4H, the service orchestration tool 227 also includes a delete button (Delete gNB), which will automatically terminate and remove the CU-CP VNF 216, CU-UP VNF 218, and DU VNF 205 in the edge cloud.

Figure 4I:
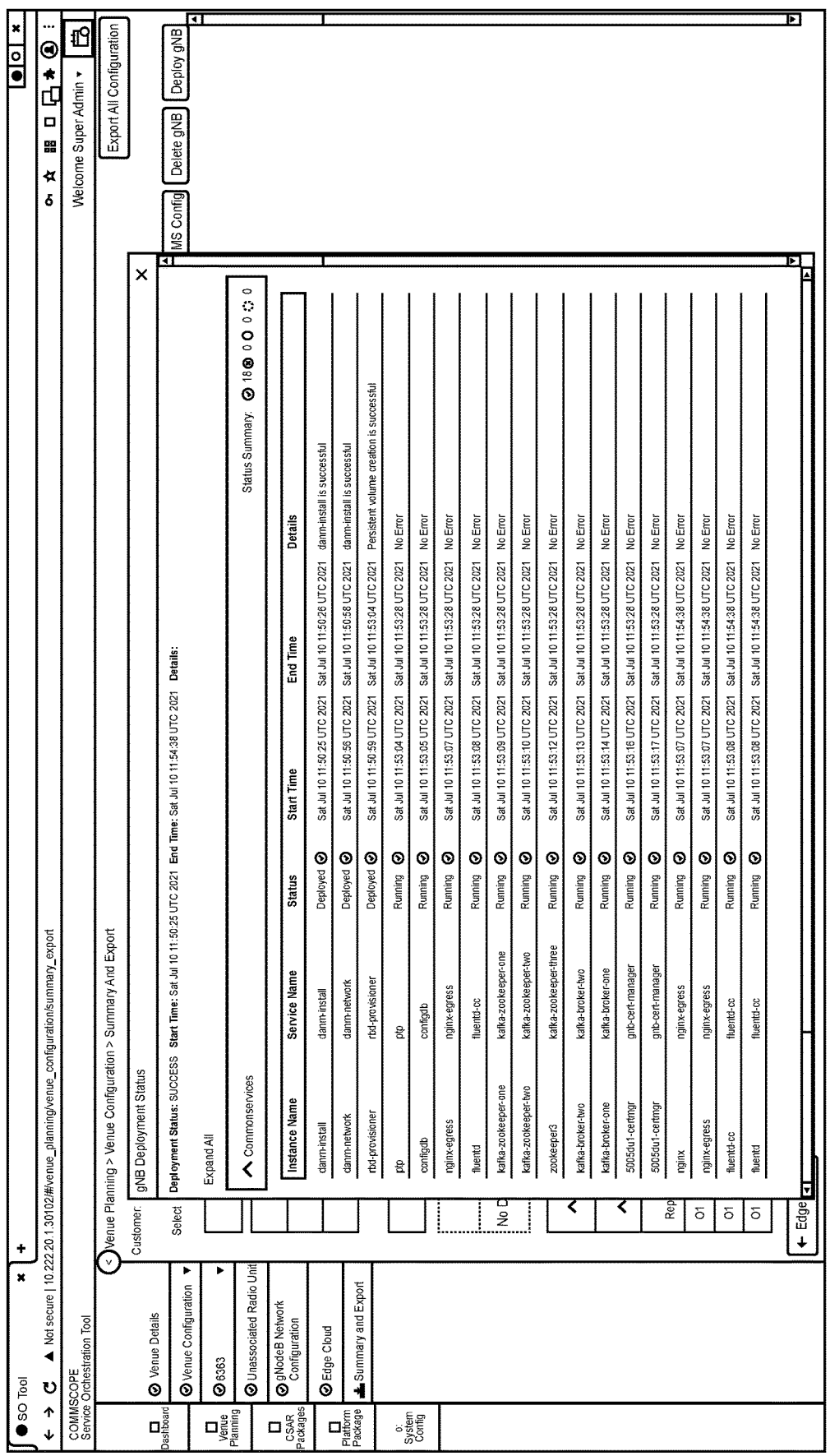

In some examples, the service orchestration tool 227 can provide a summary and/or status of the deployment of a virtualized gNB. FIG. 4I is a screen shot of an example implementation of an interface of the service orchestration tool 227. In the example shown in FIG. 4I, the interface displays a status for the different instances/services associated with the deployment of the virtualized gNB. In the example shown in FIG. 4I, the interface also displays additional details related to the services/instances (for example, start/end times and details regarding completion or errors during deployment).

Other examples are implemented in other ways.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random-access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

EXAMPLE EMBODIMENTS

Example 1 includes a system for orchestrating wireless service, comprising: a scalable cloud environment configured to implement: a base station using a plurality of virtualized base station entities, wherein each virtualized base station entity of the plurality of virtualized base station entities is configured to implement at least some functions for one or more layers of a wireless interface used to communicate with user equipment; and a service orchestration tool including one or more interfaces configured to receive common configuration parameters that are applicable to multiple sites of an operator and to receive site-specific configuration parameters that are unique to respective sites of the operator; wherein the service orchestration tool is configured to automatically generate deployment files for the plurality of virtualized base station entities based on the common configuration parameters and the site-specific configuration parameters.

Example 2 includes the system of Example 1, wherein the plurality of virtualized base station entities include: a virtualized central unit (vCU), wherein the vCU is configured to implement at least one CU-control-plane (CU-CP) virtual network function and at least one CU-user-plane (CU-UP) virtual network function; and a virtualized distributed unit (vDU) served by the vCU, wherein the vDU is configured to serve at least some of the user equipment, wherein the vDU is configured to implement at least one DU virtual network function.

Example 3 includes the system of Example 2, wherein the system comprises one or more radio units (RUs), wherein each RU is communicatively coupled to the vDU and is associated with a respective set of one or more antennas via which downlink radio frequency signals are radiated to at least some of the user equipment and via which uplink radio frequency signals transmitted by at least some of the user equipment are received.

Example 4 includes the system of any of Examples 1-3, wherein the common configuration parameters include: data provided from the operator including a virtual local area network (VLAN) identifier for mobile core network traffic and mobile core network server information; data provided from a management service provider including Element Management Server (EMS) server information, host specific configurations for the plurality of virtualized base station entities, and security information; and/or service orchestration tool configurations including VLAN IP address range for internal traffic, interface name format, deployment name format, service name format, and remote unit (RU) IP address range.

Example 5 includes the system of any of Examples 1-4, wherein the site-specific configuration parameters include: data provided from the operator including a source IP address range for a site for core network communication, radio access network (RAN) configurations for the plurality of virtualized base station entities, and identifiers for the plurality of virtualized base station entities; and/or data provided from a management service provider including deployment specific parameters for the plurality of virtualized base station entities, Precision Time Protocol (PTP) configurations, venue information, bill of materials, and/or external virtual local area network (VLAN) IP address range.

Example 6 includes the system of any of Examples 1-5, wherein the service orchestration tool is configured to automatically generate the deployment files for the plurality of virtualized base station entities by assigning default configuration settings based on the common configuration parameters, wherein the system is configured to substitute one or more of the default configuration settings with site-specific configuration settings based on the site-specific configuration parameters after the plurality of virtualized base station entities are brought into an operational state.

Example 7 includes the system of any of Examples 1-6, wherein the deployment files for each respective virtualized base station entity of the plurality of virtualized base station entities include a plurality of configuration settings used to implement interfaces of the respective virtualized base station entity for different traffic types, wherein the plurality of configuration settings includes identifiers for the interfaces, virtual local area network identifier information for the interfaces, and IP addresses for the interfaces.

Example 8 includes the system of Example 7, wherein the service orchestration tool is configured to assign a same identifier for each interface of the plurality of virtualized base station entities that is used to communicate a same traffic type.

Example 9 includes the system of any of Examples 1-8, wherein the service orchestration tool is further configured to automatically generate one or more additional configuration files based on the common configuration parameters and the site-specific configuration parameters, wherein the one or more additional configuration files are utilized to orchestrate and/or instantiate the plurality of virtualized base station entities.

Example 10 includes the system of Example 9, wherein the one or more additional configuration files include one or more edge cloud configuration files and one or more configuration files that can be utilized by an Element Management System (EMS).

Example 11. Method for orchestrating a virtualized gNB, comprising: using a scalable cloud environment configured to implement: a base station using a plurality of virtualized entities, wherein each virtualized entity of the plurality of virtualized entities is configured to implement at least some functions for one or more layers of a wireless interface used to communicate with user equipment; and a service orchestration tool including one or more interfaces configured to receive common configuration parameters that are applicable to multiple sites of an operator and to receive site-specific configuration parameters that are unique to respective sites of the operator, wherein the service orchestration tool is configured to automatically generate deployment files for the plurality of virtualized entities based on the common configuration parameters and the site-specific configuration parameters.

Example 12 includes the method of Example 11, wherein the plurality of virtualized entities include: a virtualized central unit (vCU), wherein the vCU is configured to implement at least one CU-control-plane (CU-CP) virtual network function and at least one CU-user-plane (CU-UP) virtual network function; and a virtualized distributed unit (vDU) served by the vCU, wherein the vDU is configured to serve at least some of the user equipment, wherein the vDU is configured to implement at least one DU virtual network function.

Example 13 includes the method of Example 12, wherein the virtualized gNB further includes one or more radio units (RUs), wherein each RU is communicatively coupled to the vDU and is associated with a respective set of one or more antennas via which downlink radio frequency signals are radiated to at least some of the user equipment and via which uplink radio frequency signals transmitted by at least some of the user equipment are received.

Example 14 includes the method of any of Examples 11-13, wherein the common configuration parameters include: data provided from the operator including a virtual local area network (VLAN) identifier for mobile core network traffic and mobile core network server information; data provided from a management service provider including Element Management System (EMS) server information, host specific configurations for the plurality of virtualized entities of the virtualized gNB, security information; and/or service orchestration tool configurations including VLAN IP address range for internal traffic, interface name format, deployment name format, service name format, and remote unit (RU) IP address range.

Example 15 includes the method of any of Examples 11-14, wherein the site-specific configuration parameters include: data provided from the operator including source IP address range for site for core network communication, radio access network (RAN) configurations for the plurality of virtualized entities of the virtualized gNB, and identifiers for the plurality of virtualized entities of the virtualized gNB; and/or data provided from a management service provider including deployment specific parameters for the plurality of virtualized entities of the virtualized gNB, Precision Time Protocol (PTP) configurations, venue information, bill of materials, and/or external virtual local area network (VLAN) IP address range.

Example 16 includes the method of any of Examples 11-15, wherein the service orchestration tool is configured to automatically generate the deployment files for the plurality of virtualized entities by assigning default configuration settings based on the common configuration parameters, wherein the method further comprises substituting one or more of the default configuration settings with site-specific configuration settings based on the site-specific configuration parameters after the plurality of virtualized entities are brought into an operational state.

Example 17 includes the method of any of Examples 11-16, wherein the deployment files for each respective virtualized entity of the plurality of virtualized entities include a plurality of configuration settings used to implement interfaces of the respective virtualized entity for different traffic types, wherein the plurality of configuration settings includes identifiers for the interfaces, virtual local area network identifier information for the interfaces, and IP addresses for the interfaces.

Example 18 includes the method of Example 17, wherein the service orchestration tool is configured to assign a same identifier for each interface of the plurality of virtualized entities that is used to communicate a same traffic type.

Example 19 includes the method of any of Examples 11-18, wherein the service orchestration tool is further configured to automatically generate one or more additional configuration files based on the common configuration parameters and the site-specific configuration parameters, wherein the one or more additional configuration files are utilized to orchestrate and/or instantiate the plurality of virtualized entities.

Example 20 includes the method of Example 19, wherein the one or more additional configuration files include one or more edge cloud configuration files and one or more configuration files that can be utilized by an Element Management System (EMS).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A system for orchestrating wireless service, comprising:
   a scalable cloud environment, implemented using processing and memory resources in physical computing devices, configured to implement:
      a base station using a plurality of virtualized base station entities, wherein each virtualized base station entity of the plurality of virtualized base station entities is configured to implement at least some functions for one or more layers of a wireless interface used to communicate with user equipment; and
      a service orchestration tool including one or more interfaces configured to receive common configuration parameters that are applicable to multiple sites of an operator and to receive site-specific configuration parameters that are unique to respective sites of the operator;
      wherein the service orchestration tool is configured to automatically generate deployment files for the plurality of virtualized base station entities based on the common configuration parameters and the site-specific configuration parameters.

2. The system of claim 1, wherein the plurality of virtualized base station entities include:
   a virtualized central unit (vCU), wherein the vCU is configured to implement at least one CU-control-plane (CU-CP) virtual network function and at least one CU-user-plane (CU-UP) virtual network function; and
   a virtualized distributed unit (vDU) served by the vCU, wherein the vDU is configured to serve at least some of the user equipment, wherein the vDU is configured to implement at least one DU virtual network function.

3. The system of claim 2, wherein the system comprises one or more radio units (RUS), wherein each RU is communicatively coupled to the vDU and is associated with a respective set of one or more antennas via which downlink radio frequency signals are radiated to at least some of the user equipment and via which uplink radio frequency signals transmitted by at least some of the user equipment are received.

4. The system of claim 1, wherein the common configuration parameters include:

data provided from the operator including a virtual local area network (VLAN) identifier for mobile core network traffic and mobile core network server information;

data provided from a management service provider including Element Management Server (EMS) server information, host specific configurations for the plurality of virtualized base station entities, and security information; and/or service orchestration tool configurations including VLAN IP address range for internal traffic, interface name format, deployment name format, service name format, and remote unit (RU) IP address range.

5. The system of claim 1, wherein the site-specific configuration parameters include:

data provided from the operator including a source IP address range for a site for core network communication, radio access network (RAN) configurations for the plurality of virtualized base station entities, and identifiers for the plurality of virtualized base station entities; and/or data provided from a management service provider including deployment specific parameters for the plurality of virtualized base station entities, Precision Time Protocol (PTP) configurations, venue information, bill of materials, and/or external virtual local area network (VLAN) IP address range.

6. The system of claim 1, wherein the service orchestration tool is configured to automatically generate the deployment files for the plurality of virtualized base station entities by assigning default configuration settings based on the common configuration parameters, wherein the system is configured to substitute one or more of the default configuration settings with site-specific configuration settings based on the site-specific configuration parameters after the plurality of virtualized base station entities are brought into an operational state.

7. The system of claim 1, wherein the deployment files for each respective virtualized base station entity of the plurality of virtualized base station entities include a plurality of configuration settings used to implement interfaces of the respective virtualized base station entity for different traffic types, wherein the plurality of configuration settings includes identifiers for the interfaces, virtual local area network identifier information for the interfaces, and IP addresses for the interfaces.

8. The system of claim 7, wherein the service orchestration tool is configured to assign a same identifier for each interface of the plurality of virtualized base station entities that is used to communicate a same traffic type.

9. The system of claim 1, wherein the service orchestration tool is further configured to automatically generate one or more additional configuration files based on the common configuration parameters and the site-specific configuration parameters, wherein the one or more additional configuration files are utilized to orchestrate and/or instantiate the plurality of virtualized base station entities.

10. The system of claim 9, wherein the one or more additional configuration files include one or more edge cloud configuration files and one or more configuration files that can be utilized by an Element Management System (EMS).

11. A method for orchestrating a virtualized gNB, comprising:

using a scalable cloud environment that is implemented using processing and memory resources in physical computing devices and configured to implement:

a base station using a plurality of virtualized entities, wherein each virtualized entity of the plurality of virtualized entities is configured to implement at least some functions for one or more layers of a wireless interface used to communicate with user equipment; and a service orchestration tool including one or more interfaces configured to receive common configuration parameters that are applicable to multiple sites of an operator and to receive site-specific configuration parameters that are unique to respective sites of the operator, wherein the service orchestration tool is configured to automatically generate deployment files for the plurality of virtualized entities based on the common configuration parameters and the site-specific configuration parameters.

12. The method of claim 11, wherein the plurality of virtualized entities include:

a virtualized central unit (vCU), wherein the vCU is configured to implement at least one CU-control-plane (CU-CP) virtual network function and at least one CU-user-plane (CU-UP) virtual network function; and a virtualized distributed unit (vDU) served by the vCU, wherein the vDU is configured to serve at least some of the user equipment, wherein the vDU is configured to implement at least one DU virtual network function.

13. The method of claim 12, wherein the virtualized gNB further includes one or more radio units (RUs), wherein each RU is communicatively coupled to the vDU and is associated with a respective set of one or more antennas via which downlink radio frequency signals are radiated to at least some of the user equipment and via which uplink radio frequency signals transmitted by at least some of the user equipment are received.

14. The method of claim 11, wherein the common configuration parameters include:

data provided from the operator including a virtual local area network (VLAN) identifier for mobile core network traffic and mobile core network server information;

data provided from a management service provider including Element Management System (EMS) server information, host specific configurations for the plurality of virtualized entities of the virtualized gNB, security information; and/or service orchestration tool configurations including VLAN IP address range for internal traffic, interface name format, deployment name format, service name format, and remote unit (RU) IP address range.

15. The method of claim 11, wherein the site-specific configuration parameters include:

data provided from the operator including source IP address range for site for core network communication, radio access network (RAN) configurations for the plurality of virtualized entities of the virtualized gNB, and identifiers for the plurality of virtualized entities of the virtualized gNB; and/or data provided from a management service provider including deployment specific parameters for the plurality of virtualized entities of the virtualized gNB, Precision Time Protocol (PTP) configurations, venue information, bill of materials, and/or external virtual local area network (VLAN) IP address range.

16. The method of claim 11, wherein the service orchestration tool is configured to automatically generate the deployment files for the plurality of virtualized entities by assigning default configuration settings based on the common configuration parameters, wherein the method further comprises substituting one or more of the default configuration settings with site-specific configuration settings based on the site-specific configuration parameters after the plurality of virtualized entities are brought into an operational state.

17. The method of claim 11, wherein the deployment files for each respective virtualized entity of the plurality of virtualized entities include a plurality of configuration settings used to implement interfaces of the respective virtualized entity for different traffic types, wherein the plurality of configuration settings includes identifiers for the interfaces, virtual local area network identifier information for the interfaces, and IP addresses for the interfaces.

18. The method of claim 17, wherein the service orchestration tool is configured to assign a same identifier for each interface of the plurality of virtualized entities that is used to communicate a same traffic type.

19. The method of claim 11, wherein the service orchestration tool is further configured to automatically generate one or more additional configuration files based on the common configuration parameters and the site-specific configuration parameters, wherein the one or more additional configuration files are utilized to orchestrate and/or instantiate the plurality of virtualized entities.

20. The method of claim 19, wherein the one or more additional configuration files include one or more edge cloud configuration files and one or more configuration files that can be utilized by an Element Management System (EMS).

* * * * *